US008155579B2

(12) United States Patent
Weaver et al.

(10) Patent No.: US 8,155,579 B2
(45) Date of Patent: Apr. 10, 2012

(54) SYSTEM AND METHOD FOR ASSIGNING AND TRACKING CLINICAL EDUCATION REQUIREMENTS FOR HEALTHCARE STUDENTS

(75) Inventors: Charlotte A. Weaver, Leawood, KS (US); Anita R. Ground, Fredericksburg, VA (US)

(73) Assignee: Cerner Innovation, Inc., Overland Park, KS (US)

( * ) Notice: Subject to any disclaimer, the term of this patent is extended or adjusted under 35 U.S.C. 154(b) by 1252 days.

(21) Appl. No.: 10/968,672

(22) Filed: Oct. 19, 2004

(65) Prior Publication Data
US 2006/0084043 A1 Apr. 20, 2006

(51) Int. Cl.
*G09B 7/00* (2006.01)
(52) U.S. Cl. ......... 434/362; 434/322; 434/323; 434/350
(58) Field of Classification Search .............. 434/322, 434/350, 365, 323, 219, 262, 366, 362; 705/3
See application file for complete search history.

(56) References Cited

U.S. PATENT DOCUMENTS

| 5,924,073 | A | 7/1999 | Tyuluman et al. | |
|---|---|---|---|---|
| 6,546,230 | B1* | 4/2003 | Allison | 434/350 |
| 6,643,493 | B2* | 11/2003 | Kilgore | 434/350 |
| 6,651,071 | B1* | 11/2003 | O'Brien et al. | 707/102 |
| 2001/0034016 | A1* | 10/2001 | Ziv-el et al. | 434/350 |
| 2002/0069086 | A1* | 6/2002 | Fracek et al. | 705/2 |
| 2002/0178038 | A1* | 11/2002 | Grybas | 705/7 |
| 2003/0031993 | A1* | 2/2003 | Pugh | 434/262 |
| 2003/0033169 | A1* | 2/2003 | Dew | 705/3 |
| 2003/0061070 | A1* | 3/2003 | Kelly et al. | 705/2 |
| 2003/0077560 | A1* | 4/2003 | Colby | 434/322 |
| 2003/0130973 | A1* | 7/2003 | Sumner et al. | 706/45 |
| 2003/0208477 | A1* | 11/2003 | Smirniotopoulos et al. | 707/3 |
| 2004/0078225 | A1* | 4/2004 | Schramm-Apple et al. | 705/2 |
| 2004/0234933 | A1* | 11/2004 | Dawson et al. | 434/262 |
| 2005/0015309 | A1 | 1/2005 | Fracek et al. | |
| 2005/0026119 | A1* | 2/2005 | Ellis et al. | 434/219 |
| 2005/0071192 | A1* | 3/2005 | Milosavljevic | 705/2 |
| 2005/0108030 | A1* | 5/2005 | Kim | 705/1 |
| 2005/0170323 | A1* | 8/2005 | Jarrell et al. | 434/262 |
| 2005/0222870 | A1 | 10/2005 | Schumann et al. | |
| 2005/0239032 | A1* | 10/2005 | Hartenberger | 434/322 |
| 2005/0255440 | A1* | 11/2005 | Downing | 434/362 |
| 2005/0277102 | A1* | 12/2005 | Gillette et al. | 434/362 |

OTHER PUBLICATIONS

Final Office Action from U.S. Appl. No. 10/968,506 dated Dec. 15, 2009, 10 pgs.
Non-Final Office Action mailed Apr. 12, 2010 for U.S. Appl. No. 10/968,506.
Office Action mailed Apr. 2, 2008 for U.S. Appl. No. 10/968,506.
Office Action mailed Jun. 23, 2009 for U.S. Appl. No. 10/968,506.
Final Office Action mailed Dec. 21, 2010 for U.S. Appl. No. 10/968,506.

* cited by examiner

*Primary Examiner* — Xuan Thai
*Assistant Examiner* — Bruk Gebremichael
(74) *Attorney, Agent, or Firm* — Shook, Hardy & Bacon L.L.P.

(57) ABSTRACT

The present invention relates to a system and method of identifying clinical competencies to be completed by a healthcare student in a computerized environment. The method receives an academic unit of time for a healthcare student and identifies one or more corresponding clinical competencies for the academic unit of time to be satisfied by the student.

16 Claims, 12 Drawing Sheets

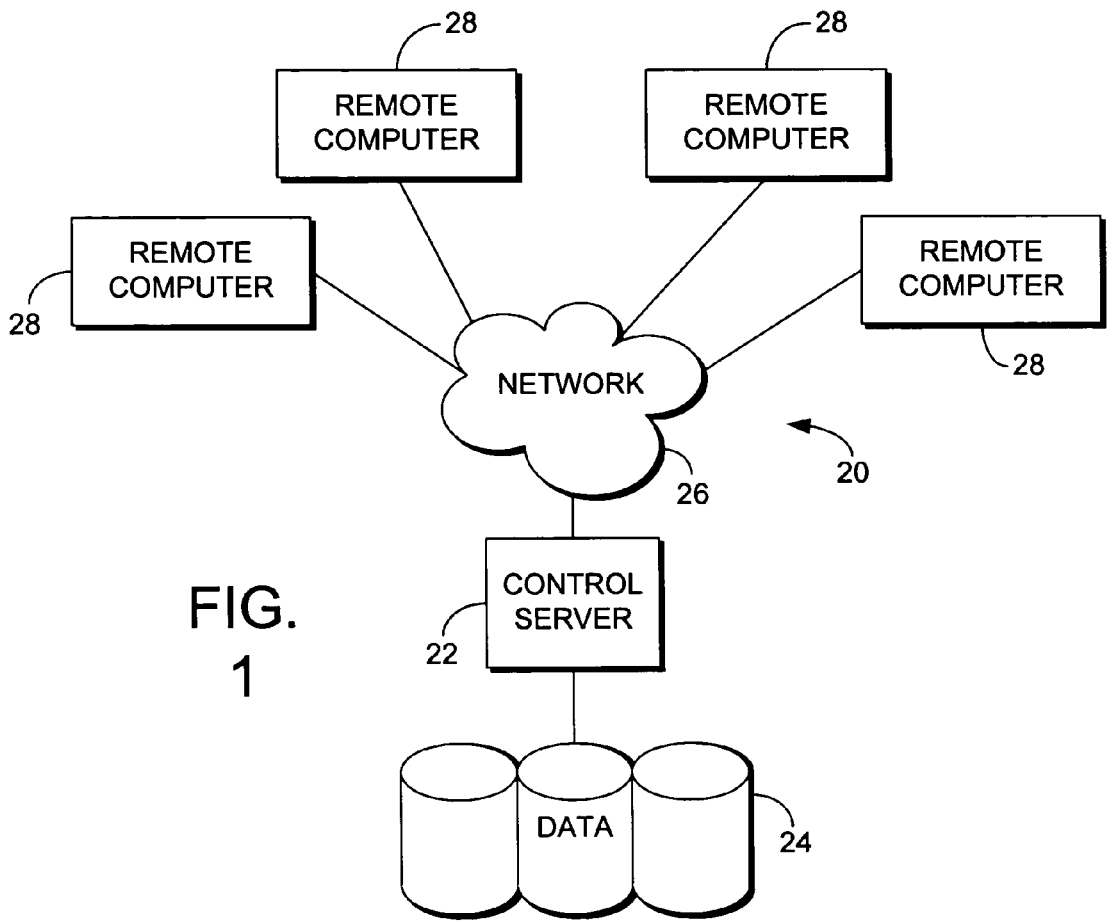
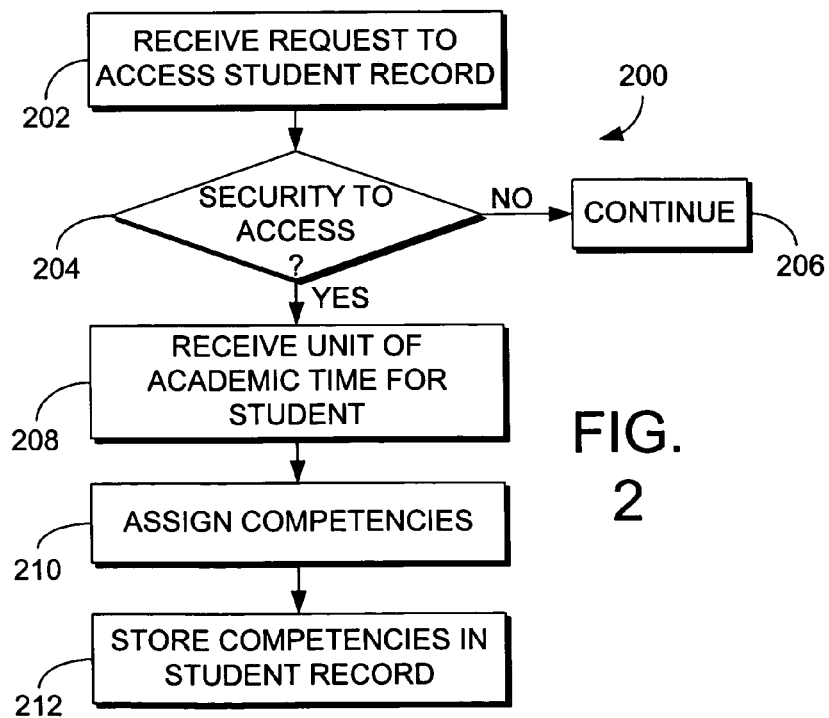

Ho, Stephanie A

Age: 23 years    Sex: Female    Location: 1 East 4    ~Allergies Not Recorded~
DOB: 2/17/1981   MRN: 000000007   Fin Number:        Inpatient [2/17/2004 4:37]

Flowsheet | Orders | Form Browser | Patient Info | Clinical Notes | Chart Summary | Task List | Intake and Output | MAR

1202

Tuesday, February 17, 2004 - Thursday, June 17, 2004 (Admission - Current)

Sort by: Date

All Forms
- Thursday, April 29, 2004
  - 1:43 PM Care Plan Rationale (Auth (Verified)) - Ground, Anita Rose
- Wednesday, March 17, 2004
  - 5:09 PM Care Plan Rationale (Auth (Verified)) - Ground, Anita Rose
  - 5:08 PM Sterile Procedures Competency (Auth (Verified)) - Ground, Anita Rose
  - 5:08 PM Staple/Suture Removal Competency (Auth (Verified)) - Ground, Anita Rose
  - 5:08 PM Physical Patient Care Competencies (Modified) - Ground, Anita Rose
  - 5:08 PM CPR Certification Verification (Auth (Verified)) - Ground, Anita Rose
  - 4:50 PM Staple/Suture Removal Competency (Auth (Verified)) - Ground, Anita Rose
- Tuesday, February 24, 2004
  - 12:31 PM Care Plan Rationale (Auth (Verified)) - Ground, Anita Rose
  - 12:30 PM Physical Patient Care Competencies (Modified) - Multi Contributors
  - 12:30 PM CPR Certification Verification (Auth (Verified)) - Warren, Judith J
- Saturday, February 21, 2004
  - 7:59 AM Vital Signs (Modified) - Multi Contributors
  - 7:59 AM Respiratory Rate (Auth (Verified)) - Ground, Anita Rose
  - 7:59 AM Care Plan Rationale (Auth (Verified)) - Ground, Anita Rose

SYSTEM AND METHOD FOR ASSIGNING AND TRACKING CLINICAL EDUCATION REQUIREMENTS FOR HEALTHCARE STUDENTS

CROSS-REFERENCE TO RELATED APPLICATIONS

This application is related by subject matter to the invention disclosed in the commonly assigned U.S. patent application Ser. No. 10/968,506, entitled "SYSTEM AND METHOD FOR DETERMINING COMPLETED CLINICAL EDUCATION REQUIREMENTS FOR HEALTHCARE STUDENTS," filed on Oct. 19, 2004.

STATEMENT REGARDING FEDERALLY SPONSORED RESEARCH OR DEVELOPMENT

Not applicable.

TECHNICAL FIELD

The present invention relates generally to the field of computer software. More particularly, the invention relates to a system and method for assigning and tracking clinical education requirements for one or more healthcare students.

BACKGROUND OF THE INVENTION

Nursing students, medical students, and other healthcare students have a wide variety of curriculum or competencies that must be mastered before graduation. These competencies and curriculum are specific to the healthcare industry. For example, students must show a minimum level of skill in hands-on clinical care. Students must exhibit proficiency in different healthcare procedures ranging from taking vital signs and respiratory rates, to being CPR certified.

The clinical and educational requirements or competencies that must be fulfilled by a healthcare student are difficult to track. Currently, student competencies are assigned and tracked manually via a paper chart or log. This is time consuming and requires faculty members to track the student's individual progress and record that progress in a paper chart or log. Furthermore, faculty can only view a student's record to determine what competencies have been met by seeing the current paper chart or log. Additionally, the student information on past competency skills, although available on a paper chart or log to the current faculty member, looking for the information is time-consuming. This makes it difficult for instructors to know whether an individual student has completed certain clinical competencies.

What would be beneficial is a system and method for assigning competencies for healthcare students and tracking these competencies so that they can be displayed to faculty members.

SUMMARY OF THE INVENTION

In one embodiment of the present invention, a system and method of identifying clinical competencies for a healthcare student in a computerized environment is provided. The method receives an academic unit of time for a healthcare student and identifies one or more corresponding clinical competencies for the academic unit of time to be satisfied by the student.

In another embodiment of the present invention, a system and method of assigning clinical academic competencies for a healthcare student in a computerized environment is provided. One or more academic competencies to be completed by a healthcare student are received. The competencies to be completed are stored in an academic record for the healthcare student.

BRIEF DESCRIPTION OF THE SEVERAL VIEWS OF THE DRAWINGS

The present invention is described in detail below with reference to the attached drawing figures, wherein:

FIG. 1 is a block diagram of a computing system environment suitable for use in implementing the present invention;

FIG. 2 is a flow diagram of a method for assigning competencies to one or more healthcare students in accordance with an embodiment of the present invention;

FIG. 10 is a screen shot displaying the fundamental competencies to be completed by a fictitious healthcare student as assigned by the healthcare faculty and in accordance with an embodiment of the present invention;

FIG. 11 is a screen shot displaying competencies to be completed by a fictitious healthcare student in accordance with an embodiment of the present invention;

FIG. 12 is a screen shot displaying a list of competencies completed by a fictitious healthcare student in accordance with an embodiment of the present invention;

FIG. 13 is a screen shot displaying a review screen of a case study for use by healthcare students and faculty in accordance with an embodiment of the present invention; and FIG. 14 is a screen shot displaying student responses to a patient case study in accordance with an embodiment of the present invention.

DETAILED DESCRIPTION OF THE INVENTION

Figure 3:
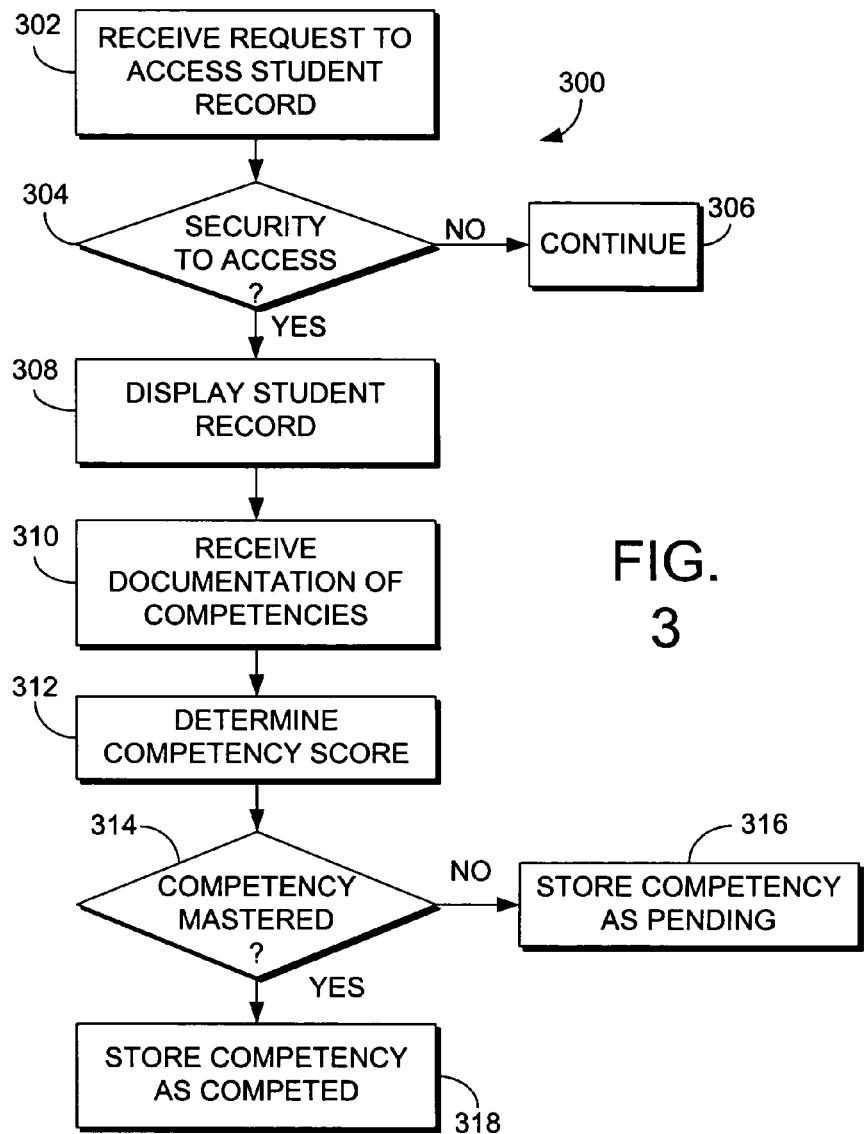
FIG. 3 is a flow diagram of a method for receiving documentation of completed student competencies in accordance with an embodiment of the present invention.

The present invention provides a system and method for assigning and tracking healthcare students' clinical educational requirements and competencies.

With reference to FIG. 1, an exemplary medical information system for implementing the invention includes a general purpose computing device in the form of server 22. Components of server 22 may include, but are not limited to, a processing unit, internal system memory, and a suitable system bus for coupling various system components, including database cluster 24 to the control server 22. The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Server 22 typically includes or has access to a variety of computer readable media, for instance, database cluster 24. Computer readable media can be any available media that can be accessed by server 22, and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information, such as computer readable instructions, data structures, program modules or other data. Computer storage media includes, but is not limited to, RAM, ROM, EEPROM, flash memory or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by server 22. Communication media typically embodies computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of computer readable media.

The computer storage media, including database cluster 24, discussed above and illustrated in FIG. 1, provide storage of computer readable instructions, data structures, program modules, and other data for server 22.

Server 22 may operate in a computer network 26 using logical connections to one or more remote computers 28. Remote computers 28 can be located at a variety of locations in a medical or research environment, for example, but not limited to, clinical laboratories, hospitals, other inpatient settings, a clinician's office, ambulatory settings, medical billing and financial offices, hospital administration, veterinary environment and home healthcare environment. Clinicians include, but are not limited to, the treating physician, specialists such as surgeons, radiologists and cardiologists, emergency medical technicians, physician's assistants, nurse practitioners, nurses, nurse's aides, pharmacists, dieticians, microbiologists, laboratory experts, genetic counselors, researchers, veterinarians, students and the like. The remote computers may also be physically located in non-traditional medical care environments so that the entire healthcare community is capable of integration on the network. Remote computers 28 may be a personal computer, server, router, a network PC, a peer device, other common network node healthcare device or the like, and may include some or all of the elements described above relative to server 22. The devices can be personal digital assistants or other like devices. Computer network 26 may be a local area network (LAN) and/or a wide area network (WAN), but may also include other networks including Internet networks via wired or wireless capability. Such networking environments are commonplace in offices, enterprise-wide computer networks, intranets and the Internet. When utilized in a WAN networking environment, server 22 may include a modem or other means for establishing communications over the WAN, such as the Internet. In a networked environment, program modules or portions thereof may be stored in server 22, or database cluster 24, or on any of the remote computers 28. By way of example, and not limitation, various application programs may reside on the memory associated with any one or all of remote computers 28. It will be appreciated that the network connections shown are exemplary and other means of establishing a communications link between the computers may be used.

A user may enter commands and information into server 22 or convey the commands and information to the server 22 via remote computers 28 through input devices, such as keyboards, pointing devices, commonly referred to as a mouse, trackball, or touch pad. Other input devices may include a microphone, satellite dish, scanner, or the like. Commands and information may also be sent directly from a remote healthcare device to the server 22. Server 22 and/or remote computers 28 may have any sort of display device, for instance, a monitor. In addition to a monitor, server 22 and/or computers 28 may also include other peripheral output devices, such as speakers and printers.

Although many other internal components of server 22 and computers 28 are not shown, those of ordinary skill in the art will appreciate that such components and their interconnection are well known. Accordingly, additional details concerning the internal construction of server 22 and computer 28 need not be disclosed in connection with the present invention.

Although the method and system are described as being implemented in a WINDOWS operating system, operating in conjunction with an Internet-based system, one skilled in the art would recognize that the method and system can be implemented in any system supporting the receipt and processing of genetic test results. As contemplated by the language above, the method and system of the present invention may also be implemented on a stand-alone desktop, personal computer, or any other computing device used in a medical environment or any of a number of other locations.

With reference to FIG. 2, a method for assigning competencies to a healthcare student 200 is provided. At block 202, a request to access one or more healthcare student records is received. Healthcare students include nursing students, nurse's aide students, allied and professional health students, medical students, continuing education healthcare students and any other healthcare student that must complete clinical healthcare as part of their education. The request received is from a faculty member, instructor, or student or anyone else who needs and is allowed access to the healthcare student's record. At decision block 204, it is determined whether the user seeking access to the student's record has security to access the record. In this embodiment, the system is structured so that only certain faculty members, and the student whose record is being accessed, have security to access the record. This protects the student from having his academic record made public. In an alternative embodiment, security is not required.

If, at decision block 204, it is determined that the user requesting access does not have security, the system continues at block 206. If, at decision block 204, it is determined that the user has security to access the student's record, at block 208 a unit of academic time for the student is received. A unit of academic time represents a particular faculty member teaching a class, the location where a class is being taught, the clinical course the student is to complete, or the academic level for a student. For example, for academic time representing a student's academic level, a first year nursing student is assigned a different academic unit of time from a second year nursing student. An example of location of a class is a clinical rotation such as ICU rotation.

At block 210 competencies based on the unit of academic time for the student are assigned. For example, the assigned competencies for a first year nursing student would be different from the assigned competencies for a second year nursing student. Exemplary competencies include physical assessments by body system, procedures such as tracheotomy care, foley catheter insertion, starting intravenous lines, dressing changes, chest tube suction etc, physical patient care such as, bathing, mouth care, bed making, and clinical or educational curriculum requirements for healthcare students. An appropriate table or database for the unit of academic time is accessed to determine the appropriate competencies to be completed by the healthcare student. At block 212, the competencies assigned to the student are stored in the student's academic record to be completed.

In an alternative embodiment, competencies are assigned to the student manually by a user selecting one or more competencies from a list or adding particular competencies. A list of possible competencies may be accessed from a table or database. A faculty member selects the competencies to be completed by a student or group of students. The assignment of competencies based on a unit of academic time for the student may be combined with manual assignments of competencies. The competencies assigned to the student are stored in his/her academic record to be completed and stored as part of the student's permanent record.

With reference to FIG. 3, a method 300 for determining what competencies a student has mastered is shown. At block 302, a request to access one or more healthcare students' record is received. At block 304, it is determined whether the user seeking to access the student's record has security. If the user does not have security at decision block 304, the system continues at block 306. If the user has security to access the student record, the system proceeds to block 308.

At block 308, the student's record or portions of a student's academic record are displayed. The display of the student's record may include completed competencies, competencies that need to be completed and CPR certification verification. At block 310, documentation of competencies completed is received. For example, a faculty member or instructor may enter into the system that a student has completed a particular competency. Alternatively, information relevant to one or more competencies is received from documentation clinical care given to patient in a patient's electronic record. If a student is on a clinical rotation treating a patient and information is documented in a patient's electronic medical record, this competency information can be sent to the student's academic record to satisfy particular pending competencies. The faculty or clinical instructors can view this assessment and plan of care to evaluate how well the student mastered the competency.

Alternatively, information relevant to one or more competencies is received from clinical care performed on a simulated patient or SIMMAN. SIMMAN is a computerized manikin programmed to simulate a number of physiological conditions requiring the student to define and perform interventions to treat the problem. The system is interactive and records the outcome for the patient and immediate responses are given to the student. An example includes when a patient shows an indication of pain, the manikin displays breathing discomfort just as a real person would in the given situation. Data from the SIMMAN exercises can be interfaced to the student's competency record. For example, the student my take vital signs, heart and lung sounds, neurological checks and these data can be interfaced to the instructional clinical information's system for a complete record of the student's clinical skills performance. Thus, while performing clinical care, information about how the student is performing is generated. Since this information may be sent from the simulated patient or SIMMAN to the student's academic record to satisfy competencies that need to be fulfilled by the student, it serves to chronicle students' longitudinal competencies and assists faculty in tracking completion and total competencies. For example, if a student performs proper CPR on a simulated patient or SIMMAN, this information is sent to the student's academic record to satisfy the CPR competency requirement for detailed information.

Figure 8:
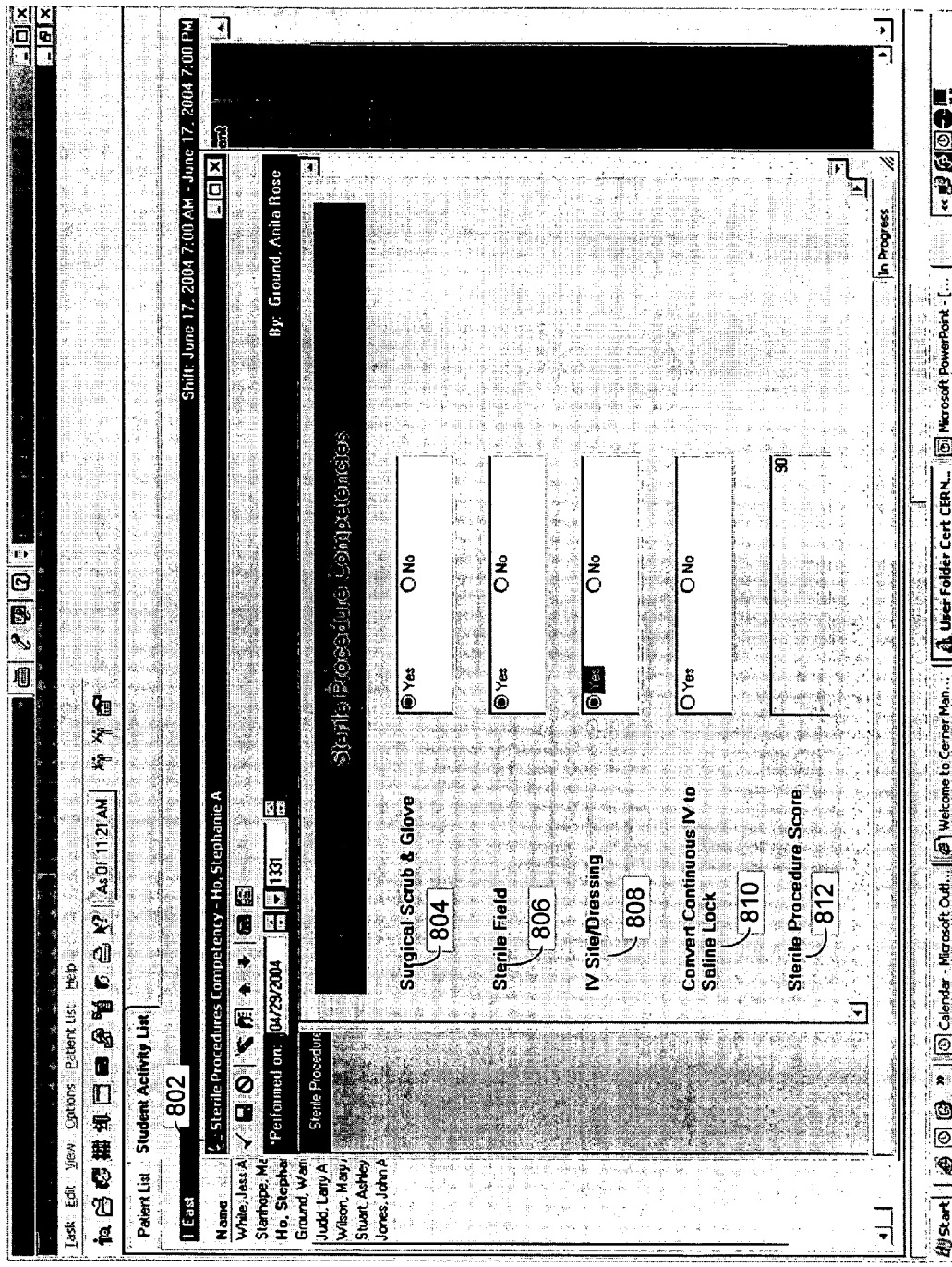
FIG. 8 is a screen shot of a set of student competencies to be documented for a healthcare student in accordance with an embodiment of the present invention.

In some instances, multiple tasks makeup a particular competency. For example, tasks for a sterile procedure competency include surgical scrub and glove, sterile field, IV site/dressing, and conversion of continuous IV to saline lock as shown in FIG. 8. The system will determine a competency score of a number of tasks completed by a student at block 312 of FIG. 3. This uses logic or rules to weigh tasks and determine score. Some competencies are not made up of multiple tasks and documentation completion means the competency has been mastered. This block 312 is optional.

At decision block 314, it is determined whether the competency has been mastered. This may be based on the calculated competency score or the fact that a competency has been documented as completed. If, at block 314, it is determined that the competency has not been mastered by the student at block 316, the competency is stored in the student record as pending and still requires the student to master the particular competency. For example, if the competency score for a particular competency does not meet a minimum score based on rules in the system, the system will generate a new request for the competency, keeping the current competency score in the record. With this new request, the student will still be required to complete the competency. If, at decision block 314, it is determined that the competency is mastered at block 318, this is stored as completed in the student record.

Figure 4:
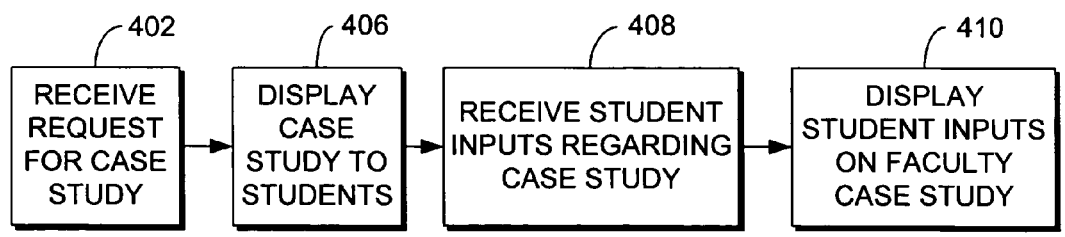
FIG. 4 is a flow diagram of a method for displaying student inputs in clinical case studies in accordance with an embodiment of the present invention.

With reference to FIG. 4, a method for receiving and displaying student input on a healthcare case study 400 is shown. At block 402, a request for a case study is received. A case study is a clinical example that allows students to use critical thinking skills to determine the appropriate assessment to be done, define the problem for the patient, and create an individualized plan of care for the fictitious patient. In a case study, students can implement a plan of care for the fictitious patient. At step 406, the case study is displayed to the requestor. At block 408, inputs from students regarding the case studies are received. At block 410, the student entries for the case study are displayed to faculty in real-time so that faculty member or instructor can view the student's entries into the case study immediately and evaluate the student's performance in the classroom.

Figure 5:
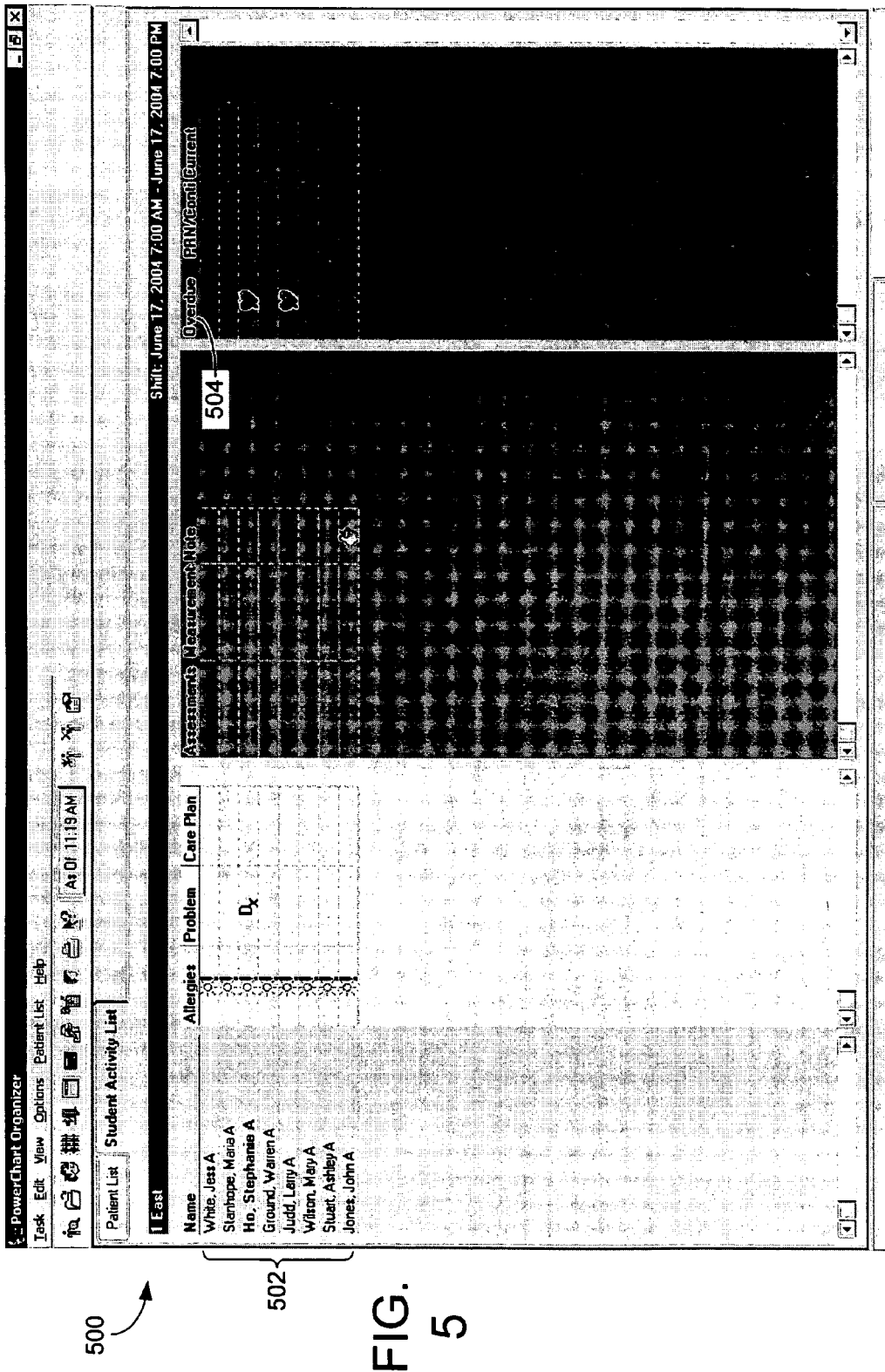
FIG. 5 is a screen shot displaying a student activity list for various fictitious healthcare students in accordance with an embodiment of the present invention.

With reference to FIG. 5, a screen shot showing an exemplary student activity list 500 is shown. A list of fictitious healthcare students 502 is displayed. Furthermore, a column showing whether a student has any competencies that are overdue 504 is shown. If the student has overdue competencies, there is an indicator in the overdue column. For example, fictitious student Stephanie Ho has an indicator in the overdue column showing that she has one or more competencies that are overdue. A faculty member can easily see which students have overdue competencies and schedule the student to complete the overdue competencies.

Figure 6:
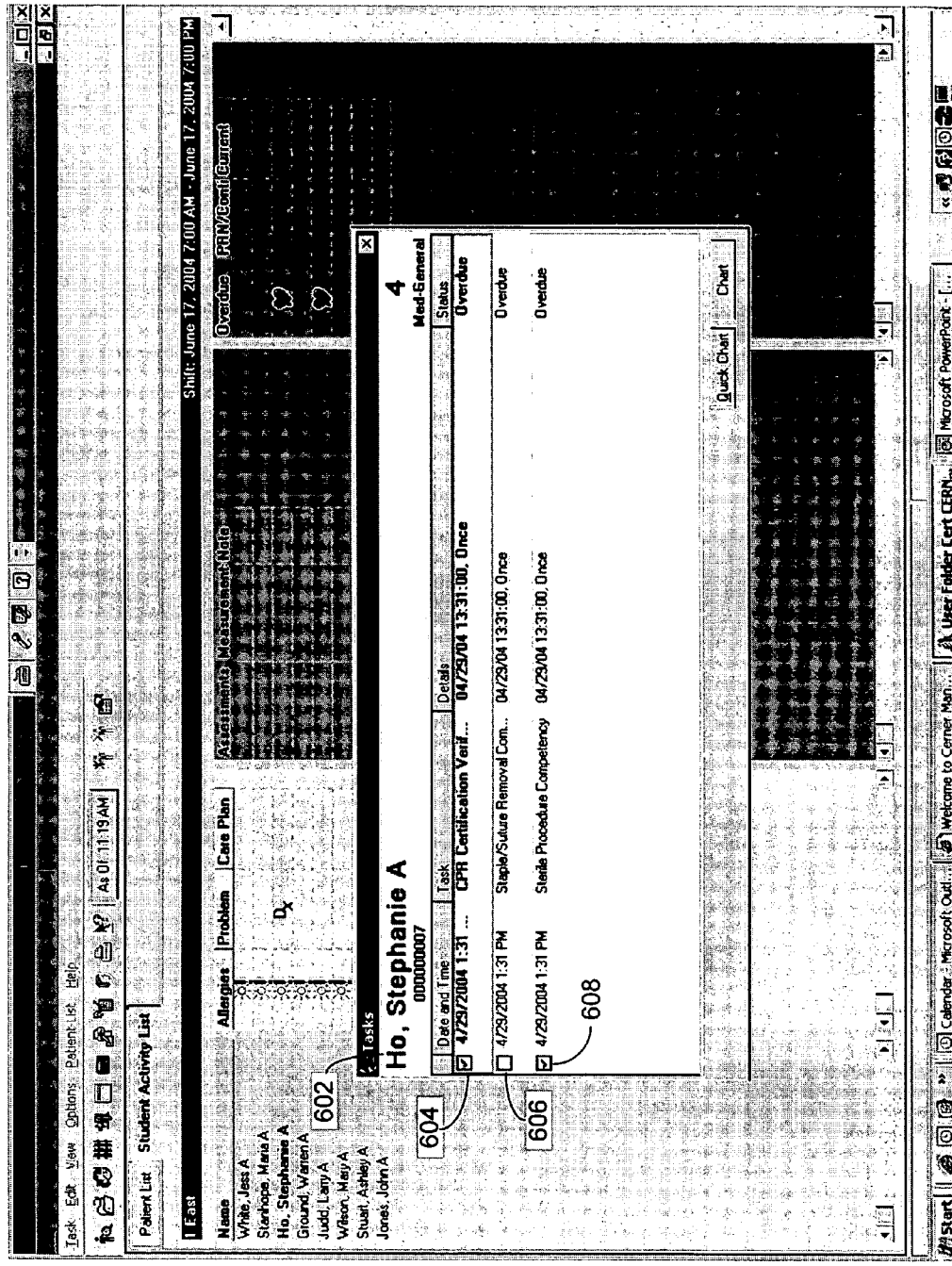
FIG. 6 is a screen shot displaying overdue competencies for a fictitious healthcare student in accordance with an embodiment of the present invention.

With reference to FIG. 6, a list of overdue competencies for a fictitious student 602 is displayed. This screen is accessed by selecting the indicator of overdue competencies from FIG. 5. The list of overdue competencies shows the overdue competencies for fictitious student Stephanie Ho 602 including CPR certification 604, staple/suture removal 606, and the sterile procedure competency 608. Overdue competencies selected from the overdue list display more information about the overdue competencies and allow a faculty member or instructor to document the completion of particular competencies.

Figure 7:
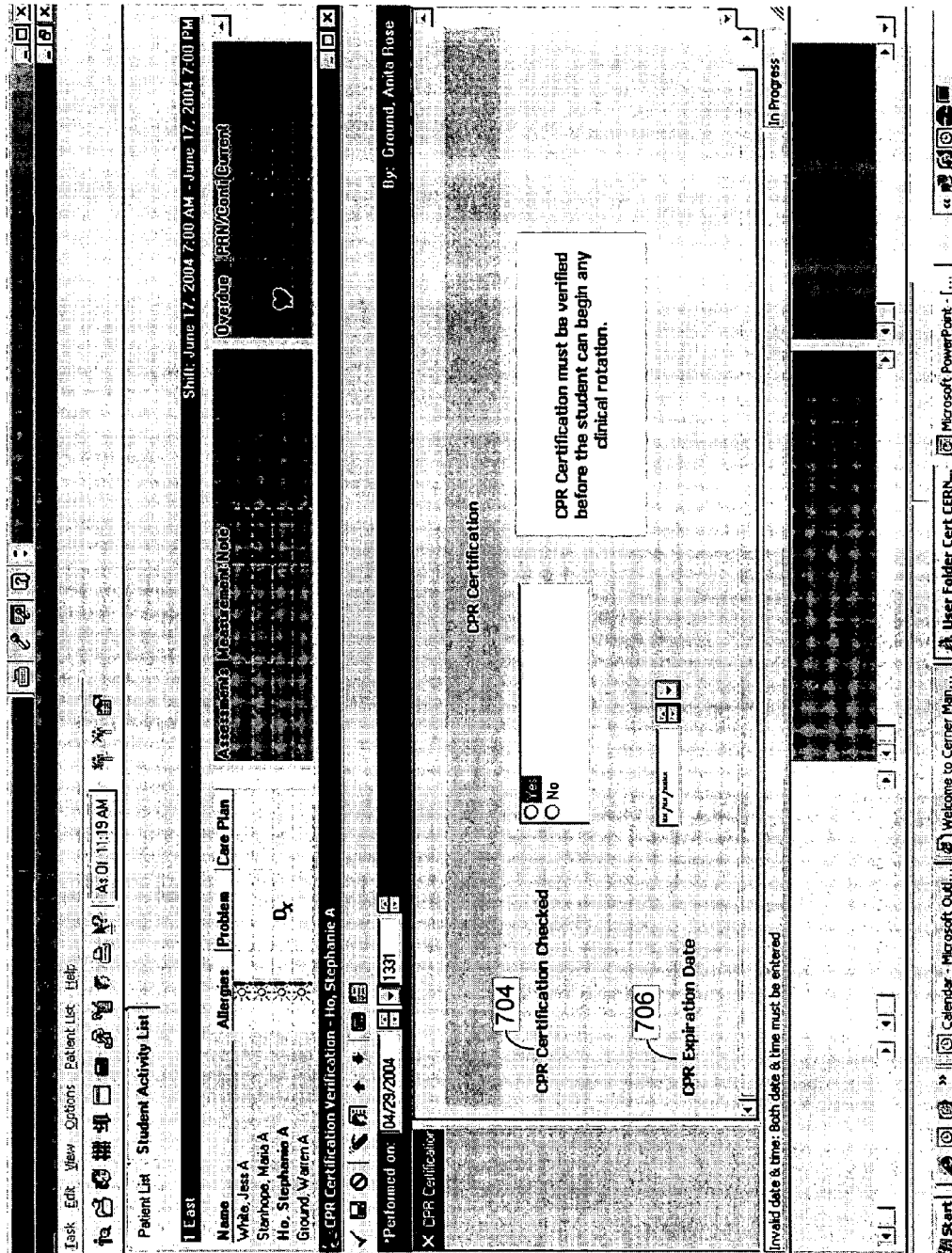
FIG. 7 is a screen shot of a CPR certification competency for a fictitious healthcare student in accordance with an embodiment of the present invention.

With reference to FIG. 7, documentation of CPR certification competency 702 for a patient for fictitious student Stephanie Ho is shown. In most instances, CPR certification must be verified before the student can begin a clinical rotation. Information entered into the CPR certification competency screen includes that the CPR certification has been checked 704 and the CPR expiration date 706. An instructor can easily see if a student is CPR certified. Thus, a student who is not CPR certified can be identified and cannot administer clinical care.

With reference to FIG. 8, if the overdue competency for sterile procedure 608 is selected from FIG. 6, documentation screen for the sterile procedure competency 802 is displayed in FIG. 8. A sterile procedure competency requires four tasks to be completed. These exemplary tasks are surgical scrub and glove 804, sterile field 806, IV site/dressing 808 and convert continuous IV to saline lock 810. Based on the number of sterile procedure tasks that have been completed, a sterile procedure score 812 can be calculated. For example, fictitious student Stephanie Ho received a sterile procedure score 812 of 90. If the student's score is passing, it will be documented in the student's academic record that the student has mastered the Sterile Procedure Competency. Rules may be built into the system to determine the minimum competency scores for particular competencies needed to pass.

Figure 9:
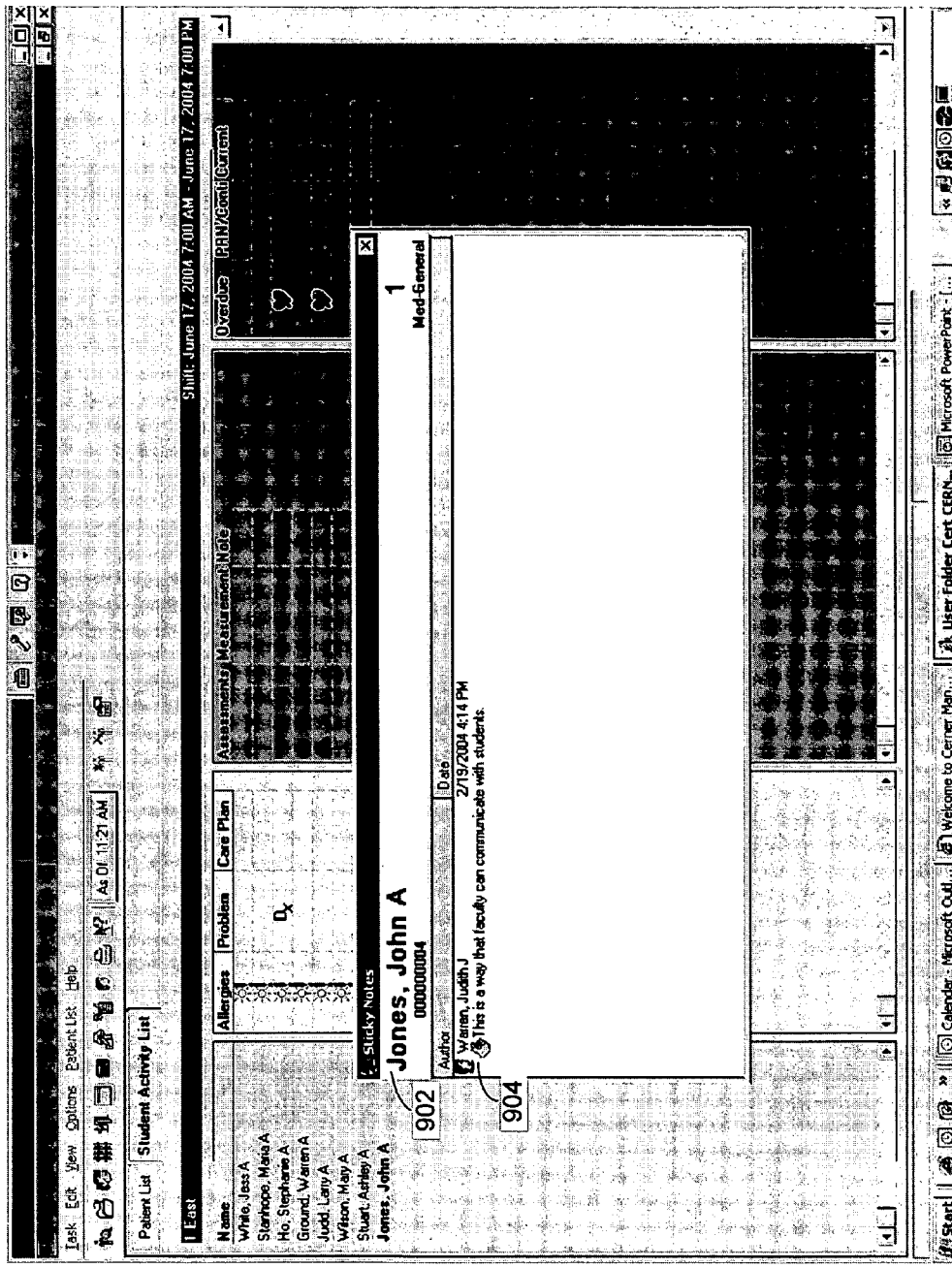
FIG. 9 is a screen shot displaying electronic notes included in a fictitious healthcare student's electronic curriculum file in accordance with an embodiment of the present invention.

With reference to FIG. 9, an electronic note that can be placed in a student's file is shown. For example, fictitious student John Jones 902 has a note in his file submitted by fictitious faculty member Judith Warren 904 representing a prototypical faculty member. The note may be regarding the curriculum or any other communication with students and between students and faculty. The note is stored in the student's academic record.

Figure 10:
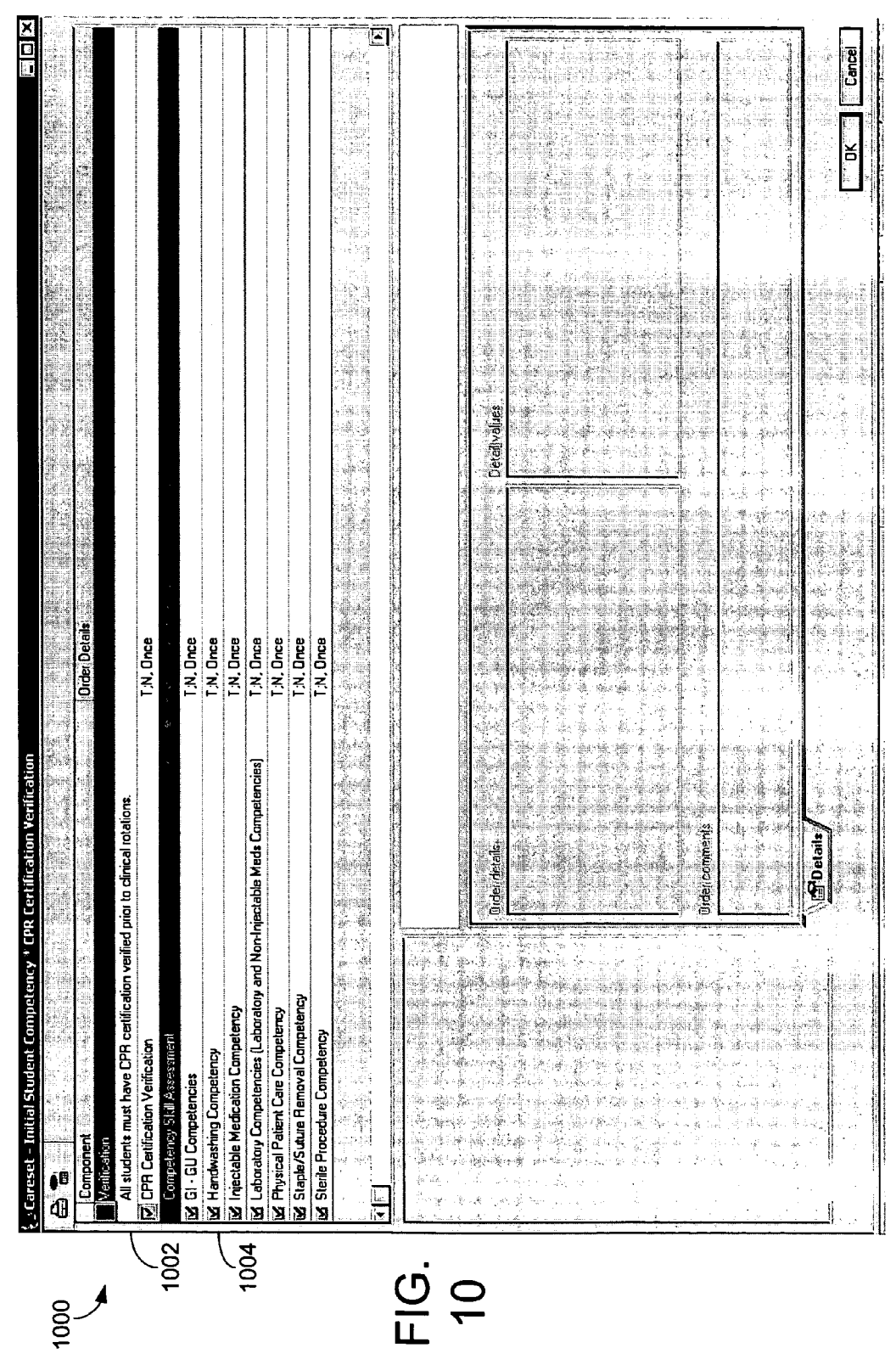

With reference to FIG. 10, clinical competencies being manually assigned from a list of competencies for a fictitious healthcare student 1000 are shown. For example, a faculty member can select a student's name and an appropriate set of competencies to be completed for the unit of academic time (e.g. clinical course enrolled). For example, clinical competencies that must be completed for this particular academic unit of time include CPR Certification Verification 1002 and Competence Skills Assessments 1004, such as GI-GU, hand washing, injectable medication, laboratory, physical patient care, staple, suture removal and sterile procedure competencies.

Figure 11:
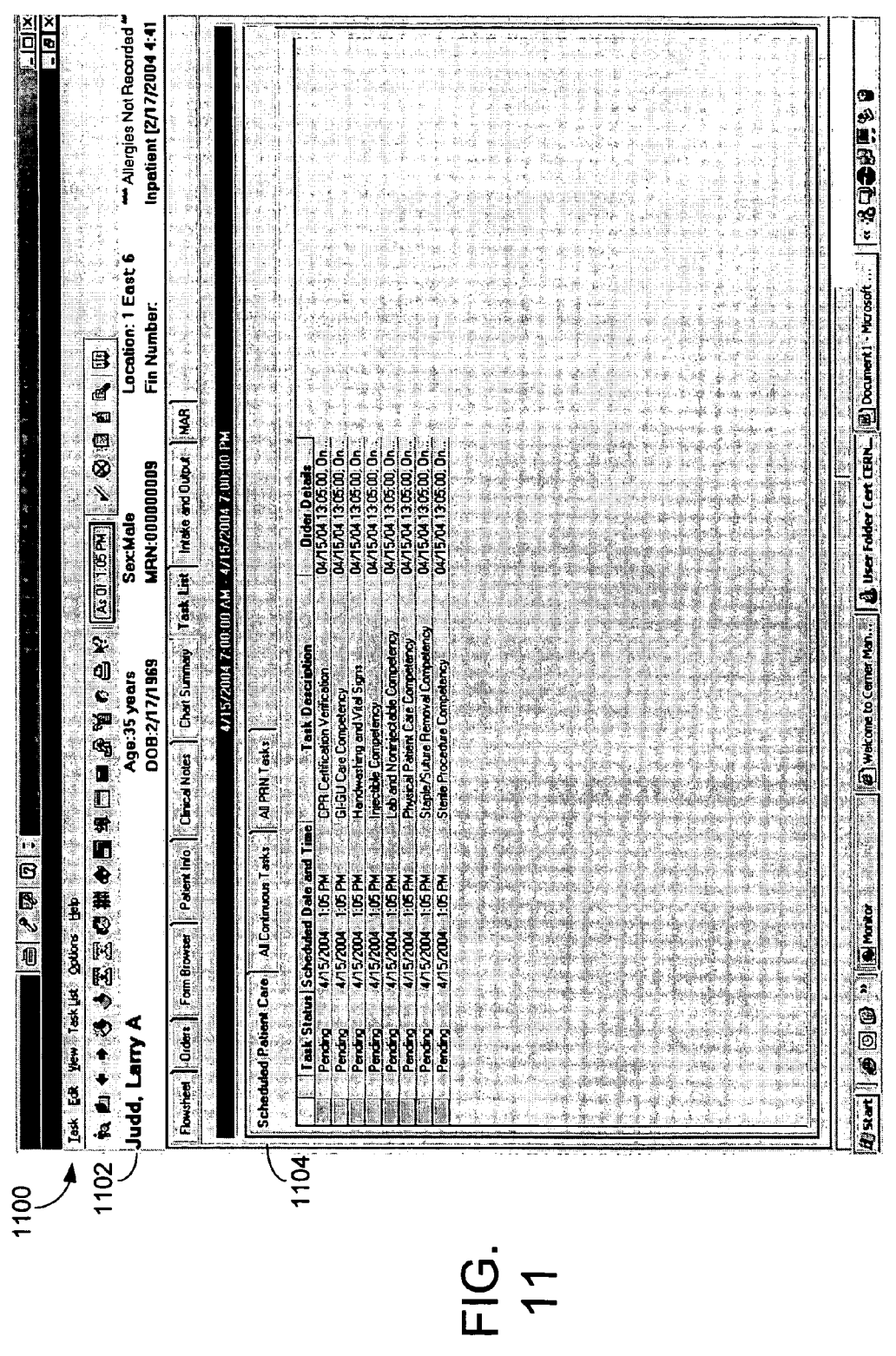

Referring next to FIG. 11, competencies to be completed by a healthcare student 1102 are shown. Students and faculty with the necessary security clearance can access the student's academic record 1100 and discover those competencies 1104 not yet completed. Each competency on the list 1104 has a date and time associated with it. When the student arrives in the clinical learning laboratory, they can look at the list to determine what competencies 1104 have not yet been completed. The list may also be filtered to show only competencies that are overdue to be completed.

With reference to FIG. 12, competencies that have been completed 1200 by a student 1202 are displayed. A list of competencies completed 1204 by the fictitious student 1202 are listed along with the date and time of completion.

Figure 13:
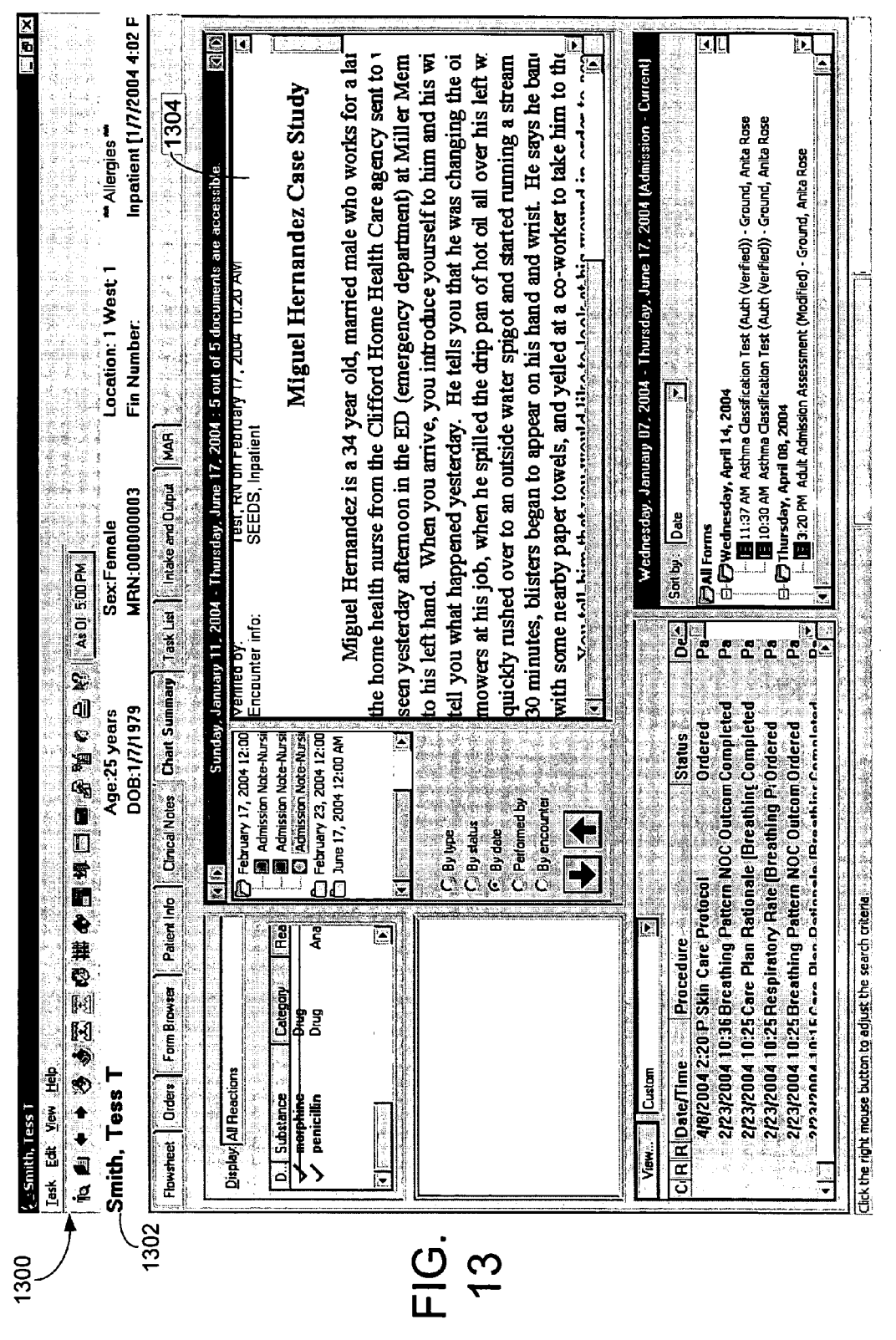

FIG. 13 is a screen 1300 displaying a case study for a fictitious patient 1302. Healthcare students can review the case study 1304 and determine what care should be provided to the patient. Students' work on the case study patient is visible in the screen 1300. Faculty members can view each student's record with respect to the case study in sequence.

Figure 14:
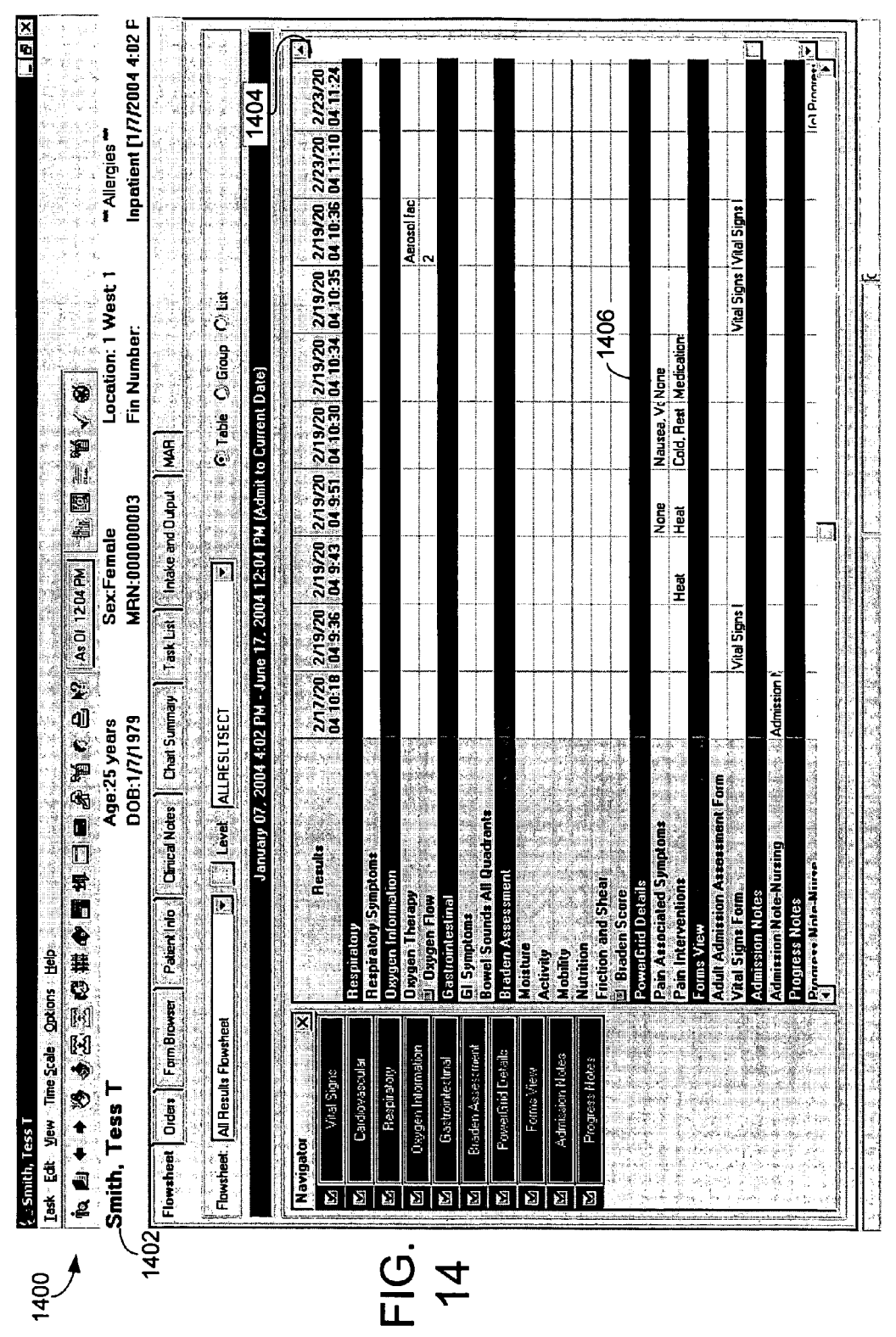

FIG. 14 is a display 1400 of all students' responses to a patient case study 1402 in a class. During class, students chart and make entries regarding the class case study. A faculty member can view all of the students' responses and provide immediate feedback. For example, if a student has entered that there are no pain-associated symptoms 1406, the faculty member will be able to see this entry and point out to the class whether there are indeed pain-associated symptoms in the patient case study. This way the students' are provided immediate feedback.

The present invention has been described in relation to particular embodiments, which are intended in all respects to be illustrative rather than restrictive. Alternative embodiments will become apparent to those skilled in the art that do not depart from its scope. Many alternative embodiments exist, but are not included because of the nature of this invention. A skilled programmer may develop alternative means for implementing the aforementioned improvements without departing from the scope of the present invention.

It will be understood that certain features and sub-combinations of utility may be employed without reference to features and sub-combinations, and are contemplated within the scope of the claims. Not all blocks listed in the various figures need to be carried out in the specific order described.

The invention claimed is:

1. A computer-implemented method for determining and displaying satisfied clinical competencies for a healthcare student in a computerized environment, the method comprising:

receiving, via an input device, a request from at least one authorized user to access one or more records of the healthcare student;

determining, via a processor, whether said authorized user has a proper security right to access the one or more records of the healthcare student;

after determining that said authorized user has the proper security right, receiving, from said authorized user, a unit of academic time for the healthcare student;

identifying, utilizing a first computer process, one or more clinical competencies for the unit of academic time to be satisfied by the healthcare student;

storing the one or more clinical competencies to be satisfied in an electronic academic record for the healthcare student;

receiving in the electronic academic record, utilizing a second computer process, documentation of clinical care of one or more patients by the healthcare student from the one or more patient's electronic medical records, wherein the documentation of clinical care is received in the electronic academic record upon being documented in the one or more patient's electronic medical records by the healthcare student while treating the one or more patients;

storing the documentation of clinical care in the electronic academic record for the healthcare student upon receiving the documentation from the one or more patient's electronic medical records, wherein the electronic academic record includes a list of one or more clinical competencies satisfied by the healthcare student based on the documentation from the one or more patient's electronic medical records while the healthcare student was treating the one or more patients, and a list of the one or more clinical competencies to be satisfied by the healthcare student based on the documentation from the one or more patient's electronic medical records while the healthcare student was treating the one or more patients, wherein the one or more clinical competencies satisfied by the healthcare student are listed along with time and date of completion;

filtering the electronic academic record to display only the one or more clinical competencies to be satisfied by the healthcare student;

determining if one of the one or more clinical competencies to be satisfied by the healthcare student have been satisfied based on the documentation received in the electronic academic record from the one or more patient's electronic medical records upon being documented in the one or more patient's electronic medical records by the healthcare student while treating the one or more patients, wherein the one or more clinical competencies to be satisfied by the healthcare student comprises multiple tasks, and the processor utilizes logic or rules to weigh tasks and determine a competency score of a number of tasks completed by the healthcare student;

comparing current competency score related to the one or more clinical competencies to be satisfied by the healthcare student to a minimum score, wherein the computer-implemented method generates a new request for the one or more clinical competencies to be satisfied by the healthcare student if the current competency score fails to meet said minimum score while keeping the current competency score in the electronic academic record;

displaying, utilizing a third computer process, the one or more clinical competencies satisfied by the healthcare student, wherein the first, second, and third computer processes are executed utilizing one or more computing devices.

2. The method of claim 1, wherein the unit of academic time is based on one of a faculty member teaching a class, the location where a class is being taught, a clinical course and the academic level of the health care student.

3. The method of claim 1, wherein the one or more clinical competencies is selected from the following clinical competencies: performing tracheotomy care, inserting a foley catheter, starting intravenous lines, changing dressings, performing chest tube suction, bathing patients, performing mouth care, making beds, checking vital signs, listening to heart and lung sounds, performing neurological checks, performing CPR, conducting a surgical scrub and glove, tending to an IV site and dressing, or converting a continuous IV to saline lock.

4. The method of claim 1, wherein the one or more clinical competencies are clinical educational competencies to be completed by the healthcare student.

5. A computer-implemented method for determining and displaying satisfied clinical academic competencies for a healthcare student in a computerized environment, the method comprising:

receiving, via an input device, a request from at least one authorized user to access one or more records of the healthcare student;

determining, via a processor, whether said authorized user has a proper security right to access the one or more records of the healthcare student;

after determining that said authorized user has the proper security right, receiving, from said authorized user, utilizing a first computer process, one or more clinical academic competencies to be completed by the healthcare student;

storing the one or more clinical academic competencies to be completed in an academic record for the healthcare student;

receiving in the academic record for the healthcare student, utilizing a second computer process, documentation of clinical care of one or more patients by the healthcare student from the one or more patient's electronic medical records, wherein the documentation of clinical care is documented in the one or more patient's electronic medical records by the healthcare student while treating the one or more patients;

storing the documentation of clinical care in the electronic academic record for the healthcare student upon receiving the documentation from the one or more patient's electronic medical records;

wherein the electronic academic record includes both a list of one or more clinical academic competencies satisfied by the healthcare student based on the documentation from the one or more patient's electronic medical records while the healthcare student was treating the one or more patients, and a list of one or more clinical academic competencies to be satisfied by the healthcare student based on the documentation from the one or more patient's electronic medical records while the healthcare student was treating the one or more patients, wherein the one or more clinical academic competencies satisfied by the healthcare student are listed along with time and date of completion;

filtering the electronic academic record to display only the one or more clinical academic competencies to be satisfied by the healthcare student;

determining, utilizing a third computer process, if one of the one or more clinical academic competencies to be satisfied by the healthcare student have been satisfied based on the documentation received from the one or more patient's electronic medical records, wherein the one or more clinical academic competencies to be satisfied by the healthcare student comprises multiple tasks, and the processor utilizes logic or rules to weigh tasks and determine a competency score of a number of tasks completed by the healthcare student;

comparing current competency score related to the one or more clinical academic competencies to be satisfied by the healthcare student to a minimum score, wherein the computer-implemented method generates a new request for the one or more clinical academic competencies to be satisfied by the healthcare student if the current competency score fails to meet said minimum score while keeping the current competency score in the electronic academic record; and displaying the electronic academic record of the healthcare student including the one or more clinical academic competencies satisfied by the healthcare student, wherein the first, second, and third computer processes are executed utilizing one or more computing devices.

6. The method of claim 5, wherein the one or more clinical academic competencies received are selections from a list of one or more clinical academic competencies.

7. The method of claim 6, wherein the list of one or more clinical academic competencies is stored within one of a database or a table.

8. The method of claim 7, further comprising: displaying the list of one or more clinical academic competencies.

9. A computer system for determining and displaying satisfied clinical competencies for a healthcare student in a computerized environment, the system comprising:
- a first receiving component for receiving a request from at least one authorized user to access one or more records of the healthcare student;
- a determining component, for determining whether said authorized user has a proper security right to access the one or more records of the healthcare student,
- wherein the first receiving component further receives, from said authorized user, a unit of academic time for the healthcare student, after determining that said authorized user has the proper security right;
- an identifying component for identifying one or more clinical competencies to be completed for the unit of academic time to be satisfied by the healthcare student;
- a first storing component for storing the one or more clinical competencies to be completed in an academic record for the healthcare student;
- a second receiving component for receiving documentation of clinical care of one or more patients by the healthcare student from the one or more patient's electronic medical records, wherein the documentation of clinical care is documented in the one or more patient's electronic medical records by the healthcare student while treating the one or more patients;
- a second storing component for storing the documentation of clinical care in the electronic academic record for the healthcare student upon receiving the documentation from the one or more patient's electronic medical records, wherein the electronic academic record for the healthcare student includes both a list of one or more clinical competencies satisfied by the healthcare student based on the documentation from the one or more patient's electronic medical records while the healthcare student was treating the one or more patients, and a list of one or more clinical competencies to be satisfied by the healthcare student based on the documentation from the one or more patient's electronic medical records while the healthcare student was treating the one or more patients,
- wherein the one or more clinical competencies satisfied by the healthcare student are listed along with time and date of completion;
- filtering the electronic academic record to display only the one or more clinical competencies to be satisfied by the healthcare student,
- wherein the determining component further determines if one of the one or more clinical competencies for the healthcare student have been satisfied based on the documentation received in the electronic academic record from the one or more patient's electronic medical records upon being documented in the one or more patient's electronic medical records by the healthcare student while treating the one or more patients,
- wherein the one or more clinical competencies to be satisfied by the healthcare student comprises multiple tasks, and the determining component utilizes logic or rules to weigh tasks and determine a competency score of a number of tasks completed by the healthcare student;
- comparing current competency score related to the one or more clinical competencies to be satisfied by the healthcare student to a minimum score, wherein the computer system generates a new request for the one or more clinical competencies to be satisfied by the healthcare student if the current competency score fails to meet said minimum score while keeping the current competency score in the electronic academic record;
- a displaying component for displaying the one or more clinical competencies satisfied by the healthcare student.

10. The system of claim 9, wherein the unit of academic time is based on one of a faculty member teaching a class, the location where a class is being taught, a clinical course and the academic level of the health care student.

11. The system of claim 9, wherein the one or more clinical competencies to be completed is selected from the following clinical competencies: performing tracheotomy care, inserting a foley catheter, starting intravenous lines, changing dressings, performing chest tube suction, bathing patients, performing mouth care, making beds, checking vital signs, listening to heart and lung sounds, performing neurological checks, performing CPR, conducting a surgical scrub and glove, tending to an IV site and dressing, or converting a continuous IV to saline lock.

12. The system of claim 9, wherein the one or more clinical competencies to be completed are clinical educational competencies to be completed by a healthcare student.

13. A computer system for assigning clinical academic competencies for a healthcare student in a computerized environment, the system comprising:
- a first receiving component for receiving a request from at least one authorized user to access one or more records of the healthcare student;
- a determining component, for determining whether said authorized user has a proper security right to access the one or more records of the healthcare student,
- wherein the first receiving component further receives, from said authorized user, one or more clinical academic competencies to be completed by the healthcare student, after determining that said authorized user has the proper security right;
- a first storing component for storing the one or more clinical academic competencies to be completed in an academic record for the healthcare student;
- a second receiving component for receiving documentation of clinical care of one or more patients by the healthcare student from the one or more patient's electronic medical records, wherein the documentation of clinical care is documented in the one or more patient's electronic medical records by the healthcare student while treating the one or more patients;
- a second storing component for storing the documentation of clinical care, received from the one or more patient's electronic medical records, in the electronic academic record for the healthcare student, wherein the electronic academic record for the healthcare student includes both a list of one or more clinical academic competencies satisfied by the healthcare student based on the documentation from the one or more patient's electronic medical records while the healthcare student was treating the one or more patients, and a list of one or more clinical academic competencies to be satisfied by the healthcare student based on the documentation from the one or more patient's electronic medical records while the healthcare student was treating the one or more patients, wherein the one or more clinical academic competencies satisfied by the healthcare student are listed along with time and date of completion;

filtering the electronic academic record to display only the one or more clinical academic competencies to be satisfied by the healthcare student, wherein the determining component further determines if one of the one or more clinical academic competencies for the healthcare student have been satisfied based on the documentation received in the electronic academic record from the one or more patient's electronic medical records, wherein the one or more clinical academic competencies to be satisfied by the healthcare student comprises multiple tasks, and the determining component utilizes logic or rules to weigh tasks and determine a competency score of a number of tasks completed by the healthcare student;

comparing current competency score related to the one or more clinical academic competencies to be satisfied by the healthcare student to a minimum score, wherein the computer system generates a new request for the one or more clinical academic competencies to be satisfied by the healthcare student if the current competency score fails to meet said minimum score while keeping the current competency score in the electronic academic record; and a displaying component for displaying the one or more clinical academic competencies satisfied by the healthcare student.

14. The system of claim 13, wherein the clinical academic competencies received are selections from a list of clinical academic competencies.

15. The system of claim 14, wherein the list of clinical academic competencies is from one of a database or a table.

16. The system of claim 15, further comprising: a second displaying component for displaying the list of clinical academic competencies.

* * * * *